(12) United States Patent
Li et al.

(10) Patent No.: US 7,215,737 B2
(45) Date of Patent: May 8, 2007

(54) DOUBLE-RADIANT-SOURCE FRAMEWORK FOR CONTAINER DETECTING SYSTEM

(75) Inventors: Jianmin Li, Beijing (CN); Zhizhong Liang, Beijing (CN); Jianjun Su, Beijing (CN); Shangmin Sun, Beijing (CN); Qing Zhang, Beijing (CN); Jing Wan, Beijing (CN); Jianxin Wang, Beijing (CN)

(73) Assignees: Tsinghua University, Beijing (CN); Nuctech Company Limited, Beijing (CN)

( * ) Notice: Subject to any disclaimer, the term of this patent is extended or adjusted under 35 U.S.C. 154(b) by 63 days.

(21) Appl. No.: 10/967,698

(22) Filed: Oct. 15, 2004

(65) Prior Publication Data

US 2006/0018428 A1    Jan. 26, 2006

(30) Foreign Application Priority Data

Oct. 16, 2003    (CN)    ........................... 200310100181

(51) Int. Cl.
*G01N 23/83* (2006.01)
(52) U.S. Cl. ..................................................... 378/57
(58) Field of Classification Search .................. 378/9, 378/57, 87, 90; 250/492.1, 493.1; 315/500, 315/505, 507
See application file for complete search history.

(56) References Cited

U.S. PATENT DOCUMENTS

| | | | | |
|---|---|---|---|---|
| 4,599,740 A * | 7/1986 | Cable | ........................... | 378/57 |
| 4,722,096 A * | 1/1988 | Dietrich et al. | ................ | 378/57 |
| 4,759,047 A * | 7/1988 | Donges et al. | ................. | 378/57 |
| 4,841,554 A * | 6/1989 | Doenges et al. | ............... | 378/57 |
| 4,884,289 A * | 11/1989 | Glockmann et al. | .......... | 378/57 |
| 5,065,418 A * | 11/1991 | Bermbach et al. | ............ | 378/57 |
| 5,754,617 A * | 5/1998 | Itoh | ............................... | 378/4 |
| 6,088,423 A * | 7/2000 | Krug et al. | .................... | 378/57 |
| 6,151,381 A * | 11/2000 | Grodzins et al. | ............. | 378/90 |
| 6,347,132 B1 * | 2/2002 | Annis | .......................... | 378/57 |
| 6,453,003 B1 * | 9/2002 | Springer et al. | .............. | 378/57 |
| 6,459,761 B1 * | 10/2002 | Grodzins et al. | ............. | 378/57 |
| 6,542,580 B1 * | 4/2003 | Carver et al. | ................. | 378/57 |
| 6,563,903 B2 | 5/2003 | Kang et al. | | |

(Continued)

FOREIGN PATENT DOCUMENTS

WO      WO 02/84268 A1     10/2002

(Continued)

*Primary Examiner*—Allen C. Ho
(74) *Attorney, Agent, or Firm*—Daniel F. Nesbitt; Hasse & Nesbitt LLC

(57) ABSTRACT

A double-radiant-source framework used for a radiation detecting system for containers, having a horizontal accelerator, a vertical accelerator and a gantry tower composed of a left vertical girder, a right vertical girder, an upper cross girder, and a lower cross girder. A horizontal collimator and accelerator, and a vertical collimator and accelerator, are fixed on the left vertical girder and the upper cross girder of the gantry tower, respectively, and emit radiation beams as two planes oriented parallel to each other. Detector modules are disposed inside the double-detector arm of the right vertical girder, and inside the upper cross girder and the lower cross girder, respectively, to receive the two emitted planes of radiation beams. The container detecting system can reduce the area covered by the scanning channel of the system, and make the transportation, installation and use convenient, and improve the quality of the detected images.

16 Claims, 2 Drawing Sheets

U.S. PATENT DOCUMENTS

| | | |
|---|---|---|
| 6,567,496 B1 * | 5/2003 | Sychev ........................ 378/57 |
| 6,597,760 B2 * | 7/2003 | Beneke et al. ................ 378/57 |
| 6,920,197 B2 * | 7/2005 | Kang et al. ................... 378/57 |
| 6,928,141 B2 * | 8/2005 | Carver et al. ................. 378/57 |
| 7,082,186 B2 * | 7/2006 | Zhao et al. ................... 378/57 |
| 2004/0091151 A1 | 5/2004 | Jin et al. |
| 2004/0125914 A1 | 7/2004 | Kang et al. |
| 2004/0213374 A1 | 10/2004 | Kang et al. |

FOREIGN PATENT DOCUMENTS

| WO | WO 03/016889 A1 | 2/2003 |
|---|---|---|
| WO | WO 04/036201 A1 | 4/2004 |

* cited by examiner

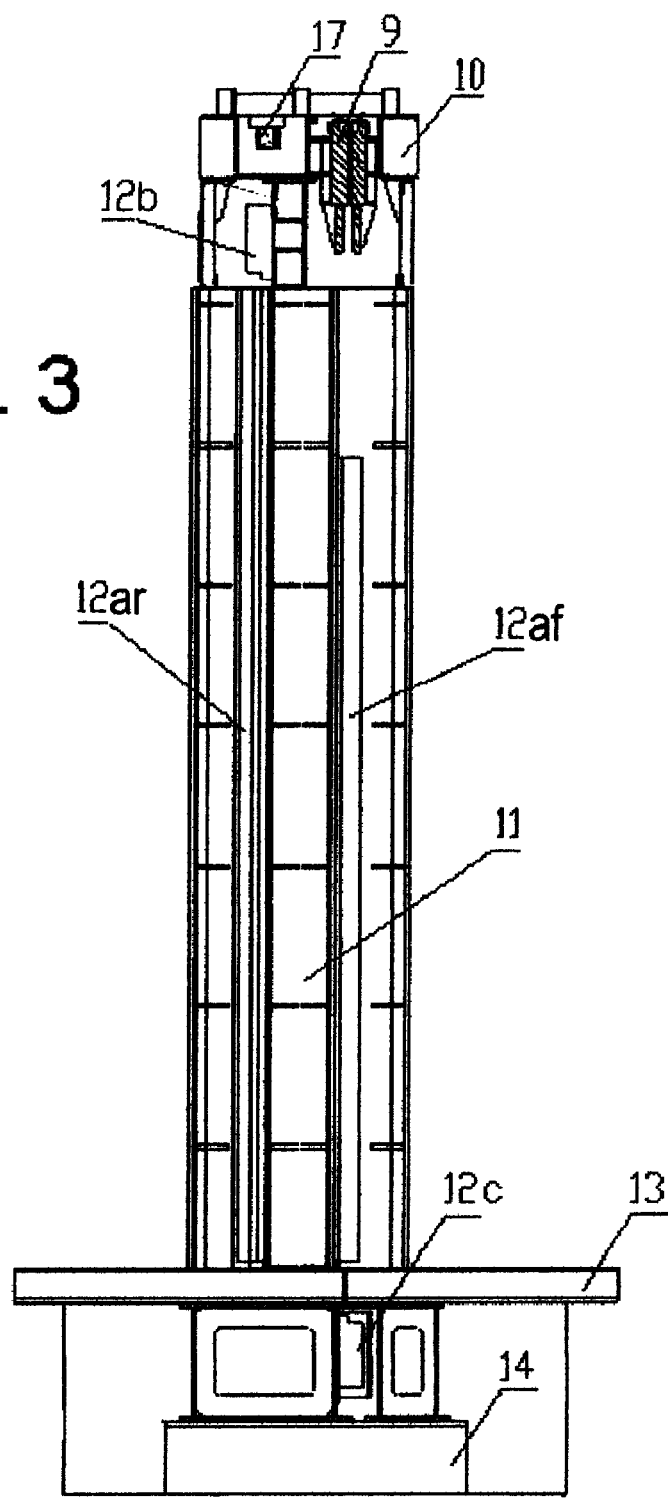

DOUBLE-RADIANT-SOURCE FRAMEWORK FOR CONTAINER DETECTING SYSTEM

BACKGROUND OF THE INVENTION

The present invention relates to a radiant source scan channel of an automatic scan type radiation detecting system for detecting large objects, and more particularly, to a double-radiant-source scan channel structure, which belongs to the technical field of radiation detection.

Container freight/vehicle detecting system is the major detecting device that the customs needs. So far, customs in most of the countries mainly adopts a method of opening the container or a method of single-radiant-source radiation imaging in the detection of the container trucks passing through the customs. The detection method of opening the container and tearing open the freight needs a long time, with a low detection amount per day, and has a high detection cost, which seriously affects the speed of the container trucks passing through the customs. In order to solve this problem, a detecting system using single-radiant-source radiation imaging was developed. The detecting system for detecting large scale container freight/vehicle using an accelerator or Co 60 as the radiant source have been developed, such as the detecting systems for detecting large scale container freight/vehicle manufactured by Heimann in Germany and Aerospace in British. The detecting system is disposed in a detecting channel capable of shielding rays, and comprises an immovable radiant source capable of generating high energy X-rays and a detector array capable of receiving X-ray that pass through the container. The vehicle loaded with containers is dragged to pass through the detecting channel using a special dragging device. When the containers move through the X-ray, the X-ray that transmit through the containers are incident to the detector, which reflects the density distribution of the contained objects in accordance with the intensity of the X-ray, and converts the intensity of the ray into image gradations so as to obtain the scenograph of the objects that are in the container. Although the aforesaid system has solved the problem of obtaining the scenograph of the objects contained in the container without opening the container and thus raises the detecting speed, it has the defects as a complex structure, a large area coverage, inconvenient installation and imperfect image effect for detection.

SUMMARY OF THE INVENTION

An aspect of the present invention provides a double-radiant-source framework used for a container detecting system.

The present invention relates to double-radiant-source framework used for a container detecting system, which belongs to the technical field of radiation detection, having a horizontal accelerator, a vertical accelerator and a gantry tower composed of a left vertical girder, a right vertical girder, an upper cross girder, and a lower cross girder. A horizontal collimator and a vertical collimator are disposed in front of the frontal face each of the horizontal accelerator and the vertical accelerator. The horizontal collimator and the vertical collimator are fixed on the left vertical girder and the upper cross girder of the gantry tower, respectively. The radiation beams defined by the horizontal collimator and the vertical collimator are two planes oriented parallel to each other. A double-detector arm is disposed inside the right vertical girder of the gantry tower, and detector modules are disposed inside the double-detector arm for receiving the two different planes of radiation beams defined by and emitted from the horizontal collimator and the vertical collimator. Detector modules are disposed inside the upper cross girder and the lower cross girder respectively for receiving separately radiation beams defined by and emitted from the horizontal collimator and the vertical collimator. The container detecting system can reduce the area covered by the scanning channel of the system, and make the transportation, installation and use convenient, and improve the quality of the detected images.

The present invention relates to a container detecting system, comprising: a horizontal accelerator for emitting radiation, a vertical accelerator for emitting radiation, a gantry tower composed of a first vertical girder, a second vertical girder, an upper cross girder, and a lower cross girder, and defining a scanning channel, a horizontal corrector and a vertical corrector disposed in front of the frontal faces of said horizontal accelerator and said vertical accelerator, respectively, a horizontal collimator aligned with the horizontal corrector, and having a slit from which radiation is emitted to define a first plane of radiation, a vertical collimator aligned with the vertical corrector, and having a slit from which radiation is emitted to define a second plane of radiation that is parallel with the first plane of radiation, a vertical collimation column for providing therein the horizontal collimator, and being fixed to the left vertical girder, a horizontal collimation girder for providing therein the vertical collimator, and being fixed to the upper cross girder, a double-detector arm mounted in the right vertical girder of the gantry tower, comprising a plurality of detector modules for receiving the first and second planes of radiation, the plurality of detector modules comprising a first horizontal detector module for receiving the first plane of radiation, and a first vertical detector module for receiving the second plane of radiation, a second horizontal detector module for receiving the first plane of radiation, a second vertical detector module for receiving the second plane of radiation, and a supporting seat on a bottom surface, wherein a lower surface of the lower cross girder of the gantry tower is fixed with the supporting seat, an end of the lower cross girder is connected to the left vertical girder and to the right vertical girder, and a bearing plate is disposed on the upper surface of the lower cross girder for allowing a container truck to pass through the scanning channel.

The present invention also relates to a double-radiant-source framework used for a container detecting system, comprising: two accelerator radiant sources, two correcting devices, a first (or left) vertical girder, a second (or right) vertical girder, an upper cross girder, and a lower cross girder, wherein the left vertical girder, the right vertical girder, the upper cross girder, and the lower cross girder form a gantry tower, and the center of the gantry tower is a scanning channel. The two accelerators are a horizontal accelerator and a vertical accelerator, respectively. A horizontal corrector and a vertical corrector are disposed in front of the frontal faces of the horizontal accelerator and the vertical accelerator, respectively. The horizontal corrector and the vertical corrector confront a horizontal collimator and a vertical collimator, respectively. Each of the horizontal collimation and vertical collimation is provided with a slit from which radiation is emitted to define a planar beam of radiation. The horizontal collimator is disposed inside a vertical collimation column, and the vertical collimator is disposed inside a horizontal collimation girder. The vertical collimation column and the horizontal collimation girder are fixed on the left vertical girder and the upper cross girder of the gantry tower, respectively. The radiation beams, which are defined by each collimation slit of the horizontal collimator and the vertical collimator, are of two different planes, and the two planes are parallel to each other. A double-detector arm is mounted inside the right vertical girder of the gantry tower, wherein the double-detector arm comprises a pair of (front and rear) detector modules that can respectively receive the radiation beams of the two different planes that are defined and emitted from the horizontal collimator and the vertical collimator. The horizontal collimation girder of the upper cross girder in the gantry tower is disposed with detector modules which can receive radiation beams defined by and emitted from the horizontal collimator. The lower cross girder in the gantry tower is disposed with detector modules which can receive radiation beams defined by and emitted from the vertical collimator. The lower surface of the lower cross girder is connected with a supporting seat that is fixed on the groundsill, and both ends of its upper surface are typically connected to the left vertical girder and the right vertical girder. A channel formed in the middle of the gantry tower is paved with bearing plates that can allow the pulling truck to pass through the scanning channel.

According to the aforesaid technical solution, the horizontal accelerator and the horizontal corrector are mounted on the groundsill, the radiation beams of the ray of the horizontal accelerator are in the same plane with the detector modules in the upper cross girder of the gantry tower and the first (or rear) detector modules (which share the same plane of radiation) in the double-detector arm through the definition of the horizontal collimator. The vertical accelerator and the vertical corrector are connected as a whole by the supporting frame, which is fixed with the upper cross girder of the gantry tower. The rays of the vertical accelerator are in the same plane with the detector modules in the lower cross girder of the gantry tower and the second (or front) detector modules (which share the same plane of radiation) in the double-detector arm through the definition of the vertical collimator.

According to the aforesaid technical solution, the right vertical girder, the upper cross girder, the lower cross girder of said gantry tower are all of box frame construction. A cavity is formed by the frame to allow the flow of a cooling gas. A lead plate is placed behind each detector module and is used for shielding radiation.

According to the aforesaid technical solution, tracks for matching the wheels of the pulled container truck are disposed on the bearing plates.

The present application adopts the aforesaid structure: two accelerators serve as radiant sources, and are disposed in the general horizontal direction and the general vertical direction, respectively, they are separate, and emit radiation beams one after another, and they both have their separate collimator and detector modules. Meanwhile, the two sets of separate radiant imaging systems are installed on the same frame member, and thus make the design of the present invention reasonable, and its structure compact. The application of the present invention to the container detecting system has the following advantage: convenient use and installation, high speed detection, high quality of the formed images, and a great rise in the speed of the container truck passing through the customs.

The present invention is further explained in combination with the figures and detailed embodiments as follows.

BRIEF DESCRIPTION OF THE DRAWINGS

FIG. 3 is a sectional elevation view taken along line B—B of FIG. 1.

DETAILED DESCRIPTION OF THE INVENTION

Figure 1:
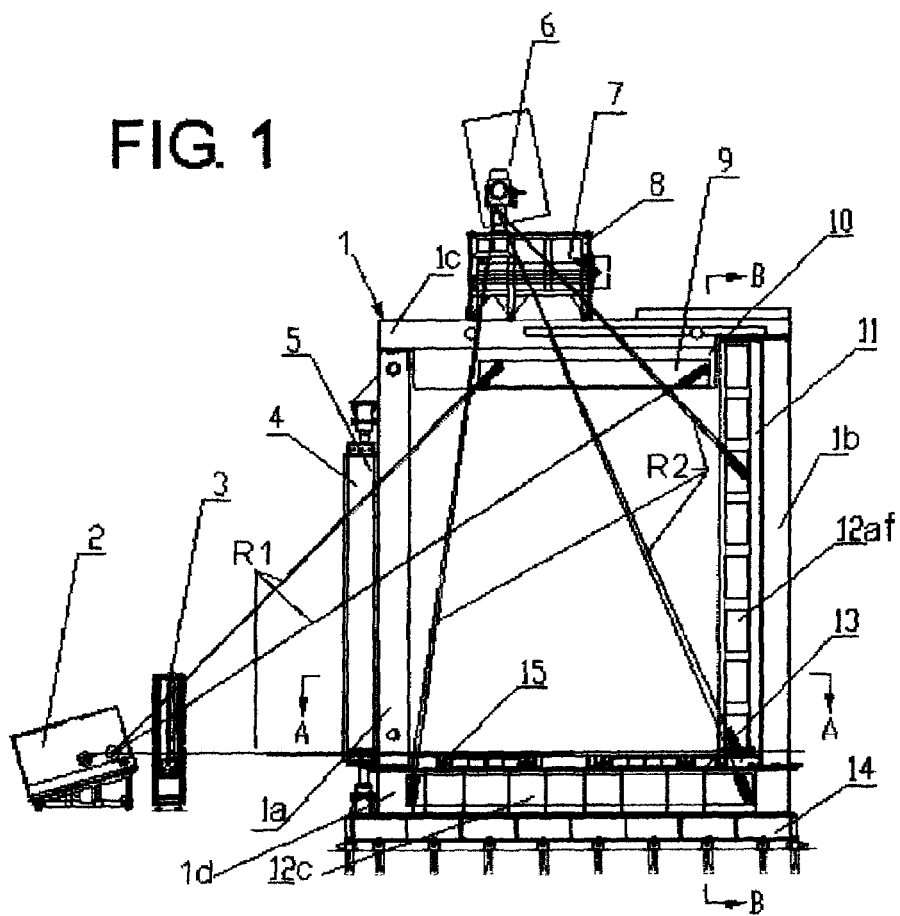
FIG. 1 is a side view of the structure of the container detecting system of the present invention.
Figure 2:
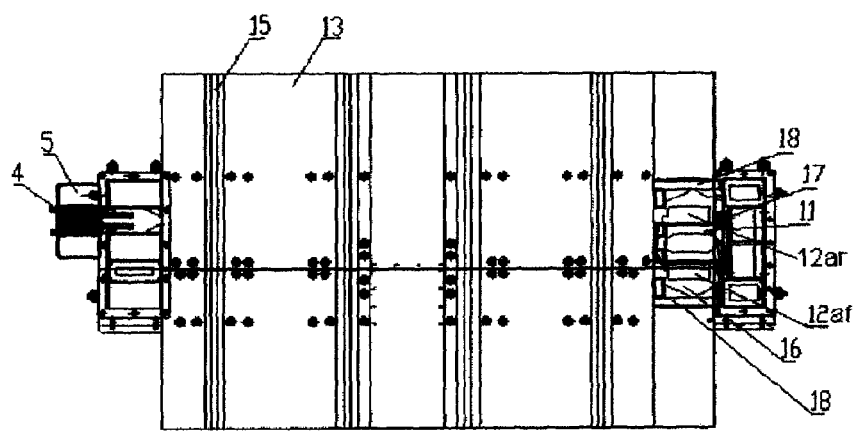
FIG. 2 is a sectional plan view taken along line A—A of FIG. 1.

Referring to FIGS. 1, 2 and 3, the double-radiant-source frame structure of the present invention comprises a horizontal accelerator 2, a vertical accelerator 6 and a gantry tower 1 consisting of a left vertical girder 1a, a right vertical girder 1b, an upper cross girder 1c, and a lower cross girder 1d. A horizontal corrector 3 and a vertical corrector 7 are disposed in front of the frontal faces of the horizontal accelerator 2 and the vertical accelerator 6, respectively. The horizontal accelerator 2 and the horizontal corrector 3 are fixed on the groundsill. The vertical accelerator 6 and the vertical corrector 7 are connected integrally by a supporting frame 8, and are fixed to the upper cross girder 1c of the gantry tower 1. The horizontal corrector 3 and the vertical corrector 7 confront a horizontal collimator 4 and a vertical collimator 9. The horizontal collimator 4 is disposed inside a vertical collimation column 5, and the vertical collimator 9 is disposed inside a horizontal collimation girder 10. The vertical collimation column 5 and the horizontal collimation girder 10 are fixed on the left vertical girder 1a and the upper cross girder 1c of said gantry tower 1, respectively. The radiation beams, which are defined by each collimation slit of the horizontal collimator 4 and the vertical collimator 9, are of two different planes, and said two planes are parallel to each other. A double-detector arm 11 is mounted inside the right vertical girder 1b of the gantry tower 1, wherein said double-detector arm 11 is disposed with rear (horizontal) detector modules 12ar, and front (vertical) detector modules 12af, which can respectively receive the radiation beams of the two different planes of radiation that are defined and emitted from the horizontal collimator 4 and the vertical collimator 9, respectively. The horizontal collimation girder 10 of the upper cross girder 1c in the gantry tower 1 is disposed with second horizontal detector modules 12b that can receive radiation beams defined by and emitted from the horizontal collimator 4. The lower cross girder 1d in the gantry tower 1 is disposed with detector modules 12c which can receive radiation beams defined by and emitted from the vertical collimator 9. The radiation beams R1 of the rays of the horizontal accelerator 2 through the definition of the horizontal collimator 4 are in the same plane with the detector modules 12b in the upper cross girder 1c of the gantry tower 1 and the rear detector module 12ar on the rear side of the double-detector arm 11. The radiation beams R2 of the rays of the vertical accelerator 6 through the definition of the vertical collimator 9 are in the same plane with the detector modules 12c in the lower cross girder of the gantry tower 1 and the front detector module 12af on the front side of the double-detector arm 11.

The lower surface of the lower cross girder 1d of the gantry tower 1 is fixed with the supporting seat 14, and both ends of its upper surface are connected to the left vertical girder 1a and the right vertical girder 1b of the gantry tower, respectively. The channel in the middle is paved with bearing plates 13 that can allow the pulled container truck to pass through the scanning channel. Tracks 15 for matching the wheels of the pulling truck used are disposed on the bearing plates 13.

The right vertical girder 1b, the upper cross girder 1c, and the lower cross girder 1d of said gantry tower 1 are all of box frame construction. A cavity 16 to allow the flow of a cooling gas is formed by a bracket 18 such that the cooling gas flowing in the cavity can cool each detector module 12. A lead plate 17 is placed behind each detector module 12 and serves for shielding radiation.

When the present invention is applied, it is installed in a scanning channel. A scan control module and an image acquiring module (not shown) are installed in an equipment cabin located outside the scanning channel. A control board is installed in a control room (not shown). The X rays emitted from the two accelerators pass through the truck to be detected and are converted into electronic signals and are input into the image acquiring module after they are received by the double-detector arm 11 of the right vertical girder of the gantry tower 1 and each detector module 12$b$ and 12$c$ in the upper cross girder and the lower cross girder. The image acquiring module then transmits the image signals to an operation detector, and finally the monitor of the computer in the control chamber displays all the results.

The transferring system used with the present invention consists of a wire rope pulling cart. When scan is executed, the container truck is loaded onto the pulling cart, and flip plates on the pulling cart are lifted to lock the front wheels of the container truck. The pulling cart is dragged by a wire rope driven by a roller powered by a winding engine. The pulling cart moves forward, and the container truck is in turn driven by the cart and moves forward. There are dragging wire ropes on both ends of the pulling cart to ensure the stability when the cart drives the container truck to move forward so as to obtain the stable scanned images.

The application of the present invention to the detecting system of large scale containers can dramatically reduce the area that the scanning channel of the system covers, and meanwhile make the installation and use of the system more convenient, as well as greatly improve the quality of the detection image.

It should be understood that those skilled in the art may make adaptations, modifications or variations according to the above description. All these adaptations, modifications, and variations should be within the protective scope of the invention. For example, all the technical solutions of the equivalent kind formed by adopting conventional means to dispose the plane of the radiation beams emitted by the two accelerators parallel in a gantry tower, and adopting other natural radioactive isotope as its radiant source, or the imaging of other ray beams fall into the protection scope of the present invention.

What is claimed is:

1. A container detecting system, comprising:
   a horizontal accelerator for emitting radiation,
   a vertical accelerator for emitting radiation,
   a gantry tower composed of a first vertical girder, a second vertical girder, an upper cross girder, and a lower cross girder, and defining a scanning channel,
   a horizontal collimator disposed in front of the horizontal accelerator, and having a slit from which radiation is emitted to define a first plane of radiation,
   a vertical collimator disposed in front of the vertical accelerator, and having a slit from which radiation is emitted to define a second plane of radiation that is parallel with the first plane of radiation,
   a vertical collimation column for providing therein the horizontal collimator, and being fixed to the first vertical girder,
   a horizontal collimation girder for providing therein the vertical collimator, and being fixed to the upper cross girder,
   a double-detector arm mounted in the second vertical girder of the gantry tower, comprising a plurality of detector modules for receiving the first and second planes of radiation, the plurality of detector modules comprising a first horizontal beam detector module for receiving the first plane of radiation, and a first vertical beam detector module for receiving the second plane of radiation,
   a second horizontal beam detector module for receiving the first plane of radiation,
   a second vertical beam detector module for receiving the second plane of radiation, and
   a supporting seat on a bottom surface, wherein a lower surface of the lower cross girder of the gantry tower is fixed with the supporting seat, a first end and a second-end of the lower cross girder is connected to the first vertical girder and to the second vertical girder, and a bearing plate is disposed on an upper surface of the lower cross girder for allowing a container truck to pass through the scanning channel.

2. The container detecting system according to claim 1, wherein said horizontal accelerator is mounted on a ground-sill such that the radiation beam emitting from the horizontal accelerator and defined by the horizontal collimator is coplanar with the second horizontal beam detector module in the upper cross girder of the gantry tower and the first horizontal beam detector module of the double-detector arm, wherein the vertical accelerator is connected by a supporting frame with the upper cross girder of the gantry tower, such that the radiation beam emitting from the vertical accelerator and defined by the vertical collimator is coplanar with the second vertical beam detector module in the lower cross girder of the gantry tower and the first vertical beam detector module of the double-detector arm.

3. The container detecting system according to claim 2, wherein the second vertical girder, the upper cross girder, and the lower cross girder each comprise a box frame having a cavity surrounded by a bracket, whereby the cavity provides a channel for the flow of a cooling gas; and a lead plate placed behind each of the detector modules for shielding radiation.

4. The container detecting system according to claim 3, further comprising tracks on the bearing plates for matching the wheels of the pulled container truck.

5. The container detecting system according to claim 1, wherein the second vertical girder, the upper cross girder, and the lower cross girder each comprise: a box frame having a cavity surrounded by a bracket, whereby the cavity provides a channel for the flow of a cooling gas; and a lead plate placed behind each of the detector modules for shielding radiation.

6. The container detecting system according to claim 5, further comprising tracks on the bearing plates for matching the wheels of the pulled container truck.

7. A container detecting system, comprising:
   a horizontal accelerator,
   a vertical accelerator,
   a gantry tower composed of a left vertical girder, a right vertical girder, an upper cross girder, and a lower cross girder,
   a horizontal collimator and a vertical collimator disposed in front of said horizontal accelerator and vertical accelerator, respectively;
   a vertical collimation column for providing therein the horizontal collimator,
   a horizontal collimation girder for providing therein the vertical collimator, wherein the vertical collimation column and the horizontal collimation girder are fixed on the left vertical girder and the upper cross girder of the gantry tower, respectively, a horizontal collimation slit provided in the horizontal collimator from which radiation from the horizontal accelerator is emitted, a vertical collimation slit provided in the vertical collimator from which radiation from the vertical accelerator is emitted, wherein the horizontal and the vertical collimation slits define radiation beams in two different planes parallel to each other, a double-detector arm mounted in the right vertical girder of the gantry tower, a plurality of detector modules for receiving, respectively, the radiation beams defined by and emitted from the horizontal collimator and the vertical collimator, provided in said double-detector arm, the plurality of detector modules comprising a first horizontal beam detector module and a first vertical beam detector module, a second horizontal beam detector module for receiving radiation beams defined by and emitted from the horizontal collimator, disposed in the horizontal collimation girder of the upper cross girder in the gantry tower, a second vertical beam detector module for receiving radiation beams defined by and emitted from the vertical collimator disposed in the lower cross girder in the gantry tower, and a supporting seat on a bottom surface, wherein a lower surface of the lower cross girder of the gantry tower is fixed with the supporting seat, a first end and a second end of an upper surface of the lower cross girder are connected to the left vertical girder and the right vertical girder, respectively, and a bearing plate is paved between said lower surface and the upper surface of the lower cross girder for allowing a pulling truck to pass through a scanning channel.

8. A container detecting system, comprising:

a gantry tower comprising a first vertical girder, a second vertical girder, an upper cross girder, and a lower cross girder, and defining a scanning channel, and wherein a first end and a second end of the lower cross girder is connected to the first vertical girder and to the second vertical girder, respectively, a horizontal accelerator for emitting radiation, a vertically-disposed horizontal collimator disposed in front of the horizontal accelerator and having a slit from which emitted radiation from the horizontal accelerator defines a first plane of radiation emitting through the scanning channel, a vertical accelerator for emitting radiation, a horizontally-disposed vertical collimator disposed in front of the vertical accelerator and having a slit from which emitted radiation from the vertical accelerator defines a second plane of radiation emitting through the scanning channel, the second plane of radiation being parallel with the first plane of radiation, a first vertically-disposed beam detector module for receiving a portion of the first plane of radiation, a second vertically-disposed beam detector module for receiving a portion of the second plane of radiation, the first vertically-disposed beam detector module and second vertically-disposed beam detector module being mounted to the second vertical girder, a first horizontally-disposed beam detector module for receiving a portion of the first plane of radiation, and being mounted to the upper cross girder, a second horizontally-disposed beam detector module for receiving a portion of the second plane of radiation, and mounted to the lower cross girder, and a bearing plate disposed on an upper surface of the lower cross girder for allowing a container truck to pass through the scanning channel.

9. The container detecting system according to claim 8, wherein the horizontal accelerator is mounted on a ground-sill such that the radiation beam emitting from the horizontal accelerator and defined by the horizontal collimator is coplanar with the first horizontally-disposed beam detector module and the first vertically-disposed beam detector module, and wherein the vertical accelerator is connected by a supporting frame with the upper cross girder of the gantry tower, such that the radiation beam emitting from the vertical accelerator and defined by the vertical collimator is coplanar with the second horizontally-disposed beam detector module and the second vertically-disposed detector module.

10. The container detecting system according to claim 9, wherein the second vertical girder, the upper cross girder, and the lower cross girder each comprise a box frame having a cavity surrounded by a bracket, whereby the cavity provides a channel for the flow of a cooling gas; and a lead plate placed behind each of the detector modules for shielding radiation.

11. The container detecting system according to claim 10, further comprising tracks on the bearing plates for matching the wheels of the container truck.

12. The container detecting system according to claim 8, wherein the second vertical girder, the upper cross girder, and the lower cross girder each comprise: a box frame having a cavity surrounded by a bracket, whereby the cavity provides a channel for the flow of a cooling gas; and a lead plate placed behind each of the detector modules for shielding radiation.

13. The container detecting system according to claim 12, further comprising tracks on the bearing plates for matching the wheels of the container truck.

14. The container detecting system according to claim 8 wherein the first vertically-disposed beam detector module and second vertically-disposed beam detector module are disposed in a double-arm detector mounted in the second vertical girder.

15. The container detecting system according to claim 8, further comprising a vertical collimation column, fixed to the first vertical girder, for providing therein the vertically-disposed horizontal collimator, and a horizontal collimation girder, fixed to the upper cross girder, for providing therein the horizontally-disposed vertical collimator.

16. The container detecting system according to claim 8, further a supporting seat on a bottom surface, wherein a lower surface of the lower cross girder of the gantry tower is fixed with the supporting seat.

* * * * *